United States Patent
Korhonen et al.

(10) Patent No.: US 10,064,035 B2
(45) Date of Patent: Aug. 28, 2018

(54) DEVICE-TO-DEVICE (D2D) RESOURCE RELEASE

(71) Applicant: Nokia Technologies Oy, Espoo (FI)

(72) Inventors: Juha Sakari Korhonen, Espoo (FI); Cassio Ribeiro, Espoo (FI)

(73) Assignee: NOKIA TECHNOLOGIES OY, Espoo (FI)

(*) Notice: Subject to any disclaimer, the term of this patent is extended or adjusted under 35 U.S.C. 154(b) by 92 days.

(21) Appl. No.: 14/932,495

(22) Filed: Nov. 4, 2015

(65) Prior Publication Data

US 2016/0135171 A1     May 12, 2016

Related U.S. Application Data

(60) Provisional application No. 62/076,805, filed on Nov. 7, 2014.

(51) Int. Cl.
| | |
|---|---|
| *H04W 72/04* | (2009.01) |
| *H04W 4/70* | (2018.01) |
| *H04W 4/00* | (2018.01) |
| H04W 72/12 | (2009.01) |
| H04W 92/18 | (2009.01) |

(52) U.S. Cl.
CPC ............ *H04W 4/70* (2018.02); *H04W 4/005* (2013.01); *H04W 72/04* (2013.01); *H04W 72/12* (2013.01); *H04W 92/18* (2013.01)

(58) Field of Classification Search
CPC ..... H04W 4/005; H04W 72/04; H04W 92/18; H04W 72/12
See application file for complete search history.

(56) References Cited

U.S. PATENT DOCUMENTS

| | | | |
|---|---|---|---|
| 2015/0163689 A1* | 6/2015 | Lee | ........................ H04W 24/10 370/328 |
| 2016/0080969 A1* | 3/2016 | Tseng | .................. H04W 76/043 370/329 |

OTHER PUBLICATIONS

3GPP TSG-RAN WG2 Meeting #87bis Shanghai, China, Oct. 6-10, 2014, "Relation Between ProSe-BSR and Resource Allocation Mode".
3GPP TSG-RAN WG2 #87bis, Shanghai, China Oct. 6-10, 2014, "Resource Allocation for ProSe-BSR".

* cited by examiner

*Primary Examiner* — Thai Nguyen
(74) *Attorney, Agent, or Firm* — Squire Patton Boggs (US) LLP

(57) ABSTRACT

Systems, methods, apparatuses, and computer program products for device-to-device (D2D) resource release are provided. One method includes indicating an early release of resources allocated to a UE.

18 Claims, 2 Drawing Sheets

DEVICE-TO-DEVICE (D2D) RESOURCE RELEASE

BACKGROUND

Field:

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology. Certain embodiments may relate to device-to-device (D2D) communication integrated into such communications networks.

Description of the Related Art:

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

Two types of communication networks include cellular networks and ad-hoc networks. As discussed above, a cellular network (e.g., UTRAN) is a radio network made up of one or more cells, where each cell is served by at least one centralized controller, such as a base station (BS), a Node B or eNB. In a cellular network, the UE communicates with another UE via the centralized controller, where the centralized controller relays messages sent by a first UE to a second UE, and viceversa. In contrast, in an ad-hoc network, a UE directly communicates with another UE, without the need of a centralized controller. Utilizing a cellular network versus an ad-hoc network has its benefits and drawbacks. For example, utilizing a cellular network over an ad-hoc network provides the benefit of easy physical resource control and interference control. However, utilizing a cellular network over an ad-hoc network also provides the drawback of inefficient physical resource utilization. For instance, additional physical resources may be required in a cellular network when the two UEs are close to each other, as compared to an ad-hoc network.

A hybrid network utilizes both a cellular mode and a device-to-device (D2D) transmission mode. In a hybrid network, a UE may choose or be ordered to communicate either via a cellular mode or a D2D transmission mode. As an example, a hybrid network may allow UEs to communicate either via a cellular mode (i.e., via a centralized controller) or via a D2D transmission mode where the UEs may establish a direct channel which may or may not be under the control of a centralized controller. Thus, a hybrid network may improve total system performance over a cellular network or an ad-hoc network. However, in order to utilize a hybrid network, issues related to physical resource sharing and interference situations may need to be addressed.

In addition, proximity services (ProSe)/D2D discovery and communication is one of the ongoing study items for 3GPP Release 12 (Rel-12) standardization (as well as Release 13 and beyond). D2D scenarios that are currently being studied in 3GPP include D2D in network coverage, out of network coverage, and partial network coverage scenarios.

BRIEF DESCRIPTION OF THE DRAWINGS

For proper understanding of the invention, reference should be made to the accompanying drawings, wherein.

DETAILED DESCRIPTION

Figure 1A:
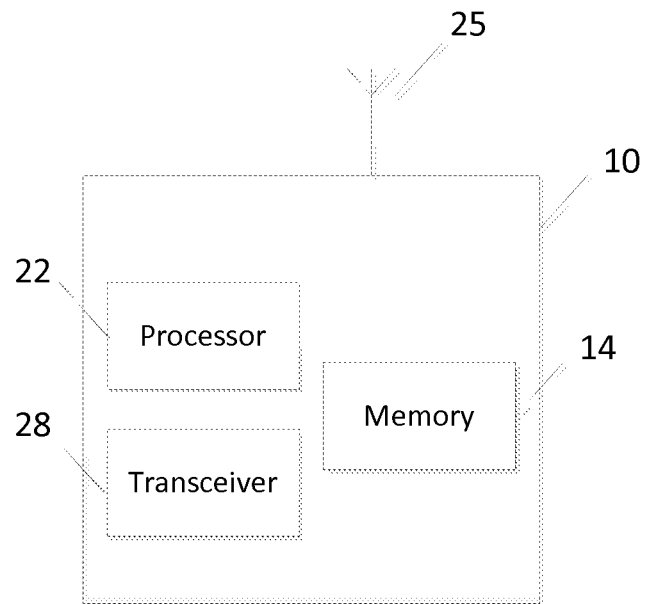
FIG. 1a illustrates an example block diagram of an apparatus, according to one embodiment.

It will be readily understood that the components of the invention, as generally described and illustrated in the figures herein, may be arranged and designed in a wide variety of different configurations. Thus, the following detailed description of the embodiments of systems, methods, apparatuses, and computer program products for device-to-device (D2D) resource release, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

A D2D broadcast communication Mode 1 is being specified for 3GPP LTE Rel-12. In this mode, the eNB may schedule resources for D2D communication based on proximity service buffer status reports (Pro-Se-BSRs) sent by UEs. A typical resource allocation period may be assumed to be tens of milliseconds, and the allocation may be based on eNB indication of a time resource pattern for transmission (T-RPT) that (with its repetitions) defines the subframes allocated for a UE to transmit. A UE may send multiple media access control (MAC) packet data units (PDUs) during an allocation period, for example transmitting four redundancy versions of a packet in four subframes. The transmitting UE may signal its resource allocation for the receiving UEs by sending a scheduling assignment (SA) message for each allocation period that it has received resources for.

Several agreements have been reached on ProSe-BSRs, and likewise with uplink (UL) BSRs, three types of buffer status reports, i.e., regular, padding, and periodic ProSe-BSRs, will be specified. A ProSe-BSR retransmission timer is defined. When a ProSe-BSR is generated in the Multiplexing and Assembly procedure, the ProSe-BSR retransmission timer may be started or re-started. A regular ProSe-BSR is triggered if one of these conditions is met: (1) if the priority is not provided by upper layer, ProSe BSR is triggered when ProSe data becomes available in currently empty ProSe group; (2) the UE receives the configuration message from the eNB for transition from mode 2 to mode 1 and the UE has data available for transmission; or (3) the ProSe-BSR retransmission timer expires and ProSe data is available in the UE for transmission.

The regular ProSe-BSR may trigger an SR transmission if no uplink resources are allocated. A periodic ProSe-BSR timer is also defined. When a ProSe-BSR, except for truncated Padding ProSe-BSR, is generated in a multiplexing and assembly procedure, the periodic ProSe-BSR timer may be started or re-started. Periodic ProSe-BSR does not trigger SR.

The UE may cancel all triggered ProSe-BSR in one of the following cases: (1) the ProSe grant allocated to the UE can accommodate all pending ProSe data available for transmission; (2) a ProSe-BSR (including truncated ProSe-BSR) is included in a MAC PDU for transmission; or (3) the UE is configured to use mode 2 but the ProSe-BSR was triggered before.

It should be noted that cancelling of a BSR, as mentioned above, does not mean signaling between a UE and eNB but only that a UE is not sending a BSR that has been triggered previously but not yet sent.

For physical uplink shared channel (PUSCH) scheduling, the eNB may have immediate feedback on the needed resources. Especially when a UE has less data to transmit than the allocation would allow, the UE may add a padding BSR indicating zero buffer status which the eNB may then take into account for the immediately following resource allocation. Because of continuous and immediate feedback, short transmission time interval (TTI) and short allocation period, UL resources can be utilized efficiently.

The long allocation period of Mode 1 D2D communication means that the ProSe-BSRs are less accurately (than PUSCH BSRs) corresponding to the actual need of resources for a whole future allocation period. Presently, there is no mechanism for releasing the allocated resources in the middle of the allocation period, which is not an ideal situation in many respects. The minimum allocation may take more resources than is actually needed, and concentrating of transmissions is not useful because all the allocated resources will remain reserved. How the eNB reaches scheduling decisions is an implementation issue, but if allocation periods are long, it could be reasonable not to base the allocation on an instantaneous buffer status but rather to try to predict the needed resources from multiple earlier buffer status reports and allocations. Such an extrapolation would sometimes lead to a situation that a UEs buffer would run empty during an allocation period, and the allocated resources for the rest of the period would be wasted. Even if the eNB would learn about the situation by frequent polling of the ProSe buffer status (e.g., by giving PUSCH resource for transmission of a periodic ProSe-BSR), it could not take the idle resources into use (for PUSCH) because, according to the present agreements, an allocation reserves the resources for the whole allocation period, allowing the UE to utilize allocated resources if new data appears after it has indicated empty buffer. If the network can rely on unnecessary resources being released, it can allocate resources more freely. Therefore, there is a need to specify rules for resource release and indication of the release.

Without the possibility to indicate early release of resources, the procedure is as follows: ProSe-BSRs are sent in PUSCH and are taken into account for Mode 1 allocations. The Mode 1 allocation is valid for a whole allocation period. If UEs buffer runs empty within an allocation period, the eNB may learn that from a ProSe-BSR and can take it into account for the next allocation period; however, some resources may be lost during the allocation period where the UE's buffer runs empty.

According to an embodiment of the invention, a UE may indicate early release of the resources allocated for it for Mode 1 communication. In an embodiment, a distinction may be made between real time and delay tolerant data, or high priority and low priority data, and the release may apply to just delay tolerant or low priority data. Despite the buffer running empty, a UE may be allowed to keep the allocated resources if the allocation was used for sending delay critical or high priority data and/or the UE may expect that delay critical or high priority data may appear later during the same allocation period. On the other hand, a UE may have to release the resources if the buffer runs empty and the allocation had been used for sending only delay tolerant or low priority data. According to certain embodiments, signaling of the release may occur through physical uplink control channel (PUCCH) resources allocated for this purpose or through ProSe-BSRs.

In one embodiment, the indication through PUCCH may be done by using a Format 1 resource with multiple occurrences during an allocation period. For example, the UE may send the Format 1 signal as soon as it decides that it will (likely) not have any data to transmit during the remainder of the allocation period.

For indication through ProSe-BSR, in one embodiment, a ProSe-BSR is triggered when the resources allocated for the UE for Mode 1 D2D communication are not any more needed by the UE. In one embodiment, the triggered ProSe-BSR may allow UE to request PUSCH resources for sending the ProSe-BSR. In another embodiment, the UE is not allowed to request PUSCH resources specially for sending the triggered ProSe-BSR but can only include the triggered ProSe-BSR when PUSCH resources are available for that.

For indication through ProSe-BSR, in another embodiment, the UE may be configured with a periodic ProSe-BSR expiry time such that a ProSe-BSR is triggered with constant intervals during the allocation period. Following the rules of periodic BSR transmission for PUSCH, the periodic ProSe-BSR may be sent only when PUSCH resources are available. During the allocation period, the eNB may poll the ProSe BS by allocating PUSCH resources and receiving the most recently generated periodic ProSe-BSR. This embodiment may be particularly useful for carrying the indication in case the UE does not have frequent PUSCH allocations for transmitting data or other control information than ProSe-BSRs towards the eNB.

According to an embodiment, one BS value (a combination of six bits) may be reserved for indicating a resource release. This would allow the UE indicating zero BS for a high priority data while still reserving the resources for the case that high priority data appears later during the allocation period.

In addition, according to an embodiment, it is possible to define a BSR directed for the UEs that are the recipients of the communication. In that BSR, the UE may indicate for the receiving UEs that the transmission was its last transmission in the allocation period. This would be appropriate for both Mode 1 and Mode 2, as it avoids the situation when the receiver will try to decode non-existent transmissions. In any case, for Mode 1, transmission of the modified BSR to the eNB, as discussed above, may still be required.

FIG. 1a illustrates an example of an apparatus 10 according to an embodiment. In an embodiment, apparatus 10 may be a node or device associated with a communications network, such as a mobile device or UE. It should be noted that one of ordinary skill in the art would understand that apparatus 10 may include components or features not shown in FIG. 1a.

As illustrated in FIG. 1a, apparatus 10 may include a processor 22 for processing information and executing instructions or operations. Processor 22 may be any type of general or specific purpose processor. While a single processor 22 is shown in FIG. 1a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be a UE or mobile device. In this embodiment, apparatus 10 may be controlled by memory 14 and processor 22 to indicate, to the network, an early release of resources allocated to the apparatus 10 for D2D mode 1 communication. In an embodiment, the early release of resources applies to delay tolerant data.

According to an embodiment, apparatus 10 may be controlled by memory 14 and processor 22 to indicate the early release of resources by signaling an indication of the early release through PUCCH resources. In this embodiment, the indication may comprise using format 1 resource with multiple occurrences during an allocation period. For example, apparatus 10 may be controlled to send the format 1 signal immediately when apparatus 10 decides it will not have any data to transmit during a remainder of the allocation period.

According to another embodiment, apparatus 10 may be controlled by memory 14 and processor 22 to indicate the early release of resources by signaling an indication of the early release through ProSe BSRs. In an alternative, the possibility of early release triggers ProSe-BSR which UE may send when PUSCH resources become available. Triggering of ProSe-BSR for early release may allow UE to request PUSCH resources for sending the ProSe-BSR. In another alternative, apparatus 10 is configured with a periodic ProSe-BSR expiry time such that a ProSe-BSR is triggered with constant intervals during the allocation period. For example, in one embodiment, the periodic ProSe-BSR may be sent when PUSCH resources are available.

In yet another embodiment, apparatus 10 may be controlled by memory 14 and processor 22 to indicate the early release of resources by indicating in a padding BSR that a transmission is the last transmission of the apparatus 10 in the allocation period.

In yet another embodiment, apparatus 10 may be controlled by memory 14 and processor 22 to indicate the early release of resources by indicating in a BSR sent to the recipients of the D2D communication that a transmission is the last transmission of the apparatus 10 in the allocation period. The recipients may be similar apparatuses 10.

Figure 1B:
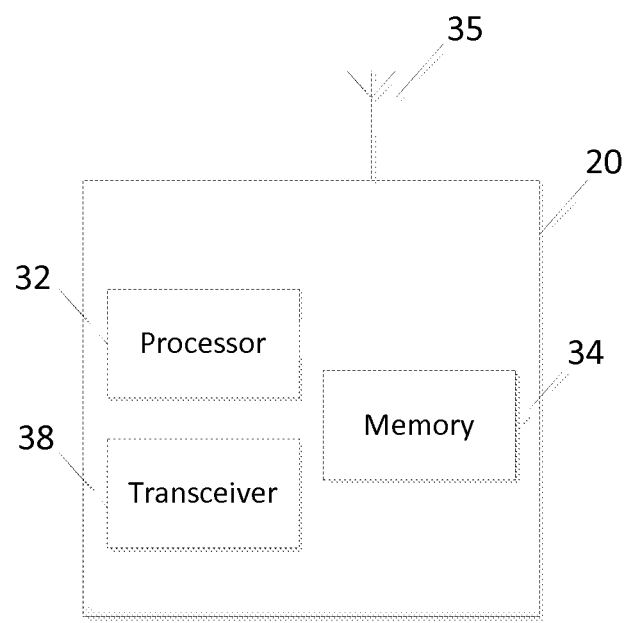
FIG. 1b illustrates an example block diagram of an apparatus, according to another embodiment.

FIG. 1b illustrates an example of an apparatus 20 according to another embodiment. In an embodiment, apparatus 20 may be a node, host, or server in a communications network or serving such a network, such as a base station in a communications network (e.g., eNB in LTE). It should be noted that one of ordinary skill in the art would understand that apparatus 20 may include components or features not shown in FIG. 1b.

As illustrated in FIG. 1b, apparatus 20 may include a processor 32 for processing information and executing instructions or operations. Processor 32 may be any type of general or specific purpose processor. While a single processor 32 is shown in FIG. 1b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further include or be coupled to a memory 34, which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 can be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

In some embodiments, apparatus 20 may also include or be coupled to one or more antennas 35 for transmitting and receiving signals and/or data to and from apparatus 20. Apparatus 20 may further include a transceiver 38 configured to transmit and receive information. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station in a communications network, such as an eNB in LTE. In this embodiment, apparatus 20 may be controlled by memory 34 and processor 32 to receive an indication, from a UE, of an early release of resources allocated to the UE for D2D mode 1 communication. In an embodiment, the early release of resources applies to delay tolerant data. In an embodiment, the indication of the early release may be received through PUCCH resources. In this embodiment, the indication may use PUCCH format 1 resource with multiple occurrences during an allocation period. For example, the format 1 signal may be received when the UE decides it will not have any data to transmit during a remainder of the allocation period.

In another embodiment, the indication of the early release of resources may be received through ProSe BSRs. In an alternative, the possibility of early release triggers ProSe-BSR which UE may send when PUSCH resources become available. Triggering of ProSe-BSR for early release may allow UE to request PUSCH resources for sending the ProSe-BSR. In another alternative, the UE may be configured with a periodic ProSe-BSR expiry time such that a ProSe-BSR is triggered with constant intervals during the allocation period. For example, in one embodiment, the periodic ProSe-BSR may be received when PUSCH resources are available.

According to another embodiment, apparatus 20 is controlled to receive the indication of the early release of resources in a padding BSR that indicates that a transmission is the last transmission of the UE in the allocation period. In an embodiment, apparatus 20 may be further controlled by memory 34 and processor 32 to poll the ProSe BS by allocating PUSCH resources and receiving the most recently generated periodic ProSe-BSR or ProSe-BSR triggered by the condition that UE may release the allocated Mode 1 D2D resources. According to one example, one BS value (e.g., a combination of six bits) may be reserved for indicating a resource release.

Figure 2A:
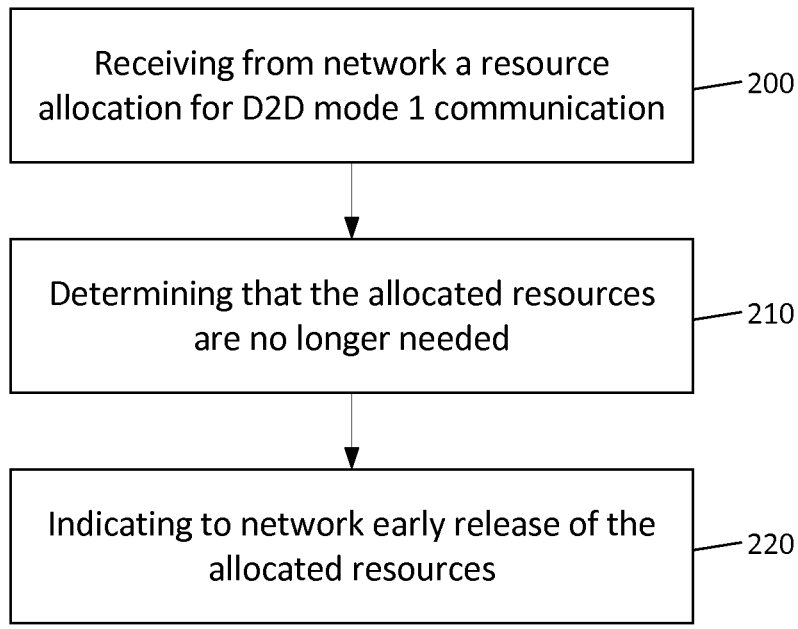
FIG. 2a illustrates an example flow diagram of a method, according to one embodiment.

FIG. 2a illustrates an example flow diagram of a method according to one embodiment. In an embodiment, the method of FIG. 2a may be executed by a mobile device or UE. The method may include, at 200, receiving a resource allocation for Mode 1 D2D communication, determining, at 210, that the allocated resources are not needed anymore, and, at 220, indicating to a network node an early release of resources allocated to the UE for D2D mode 1 communication. In an embodiment, the early release of resources applies to delay tolerant data.

According to an embodiment, the indicating of the early release of resources may include signaling an indication of the early release through PUCCH resources. The indication may comprise using PUCCH format 1 resource with multiple occurrences during an allocation period. For example, in this embodiment, the indicating of the early release of resources may include sending the format 1 signal immediately when the UE decides it will not have any data to transmit during a remainder of the allocation period.

According to another embodiment, the indicating of the early release of resources may include signaling an indication of the early release through ProSe BSRs. In an alternative, the possibility of early release triggers ProSe-BSR which UE may send when PUSCH resources become available. Triggering of ProSe-BSR for early release may allow UE to request PUSCH resources for sending the ProSe-BSR. In another alternative, the method may include configuring the UE with a periodic ProSe-BSR expiry time such that a ProSe-BSR is triggered with constant intervals during the allocation period. For example, in this embodiment, the method may include sending the periodic ProSe-BSR when PUSCH resources are available.

In yet another embodiment, the indicating of the early release of resources may include indicating in a BSR to the recipients of the D2D communication that a transmission is the last transmission of the UE in the allocation period.

Figure 2B:
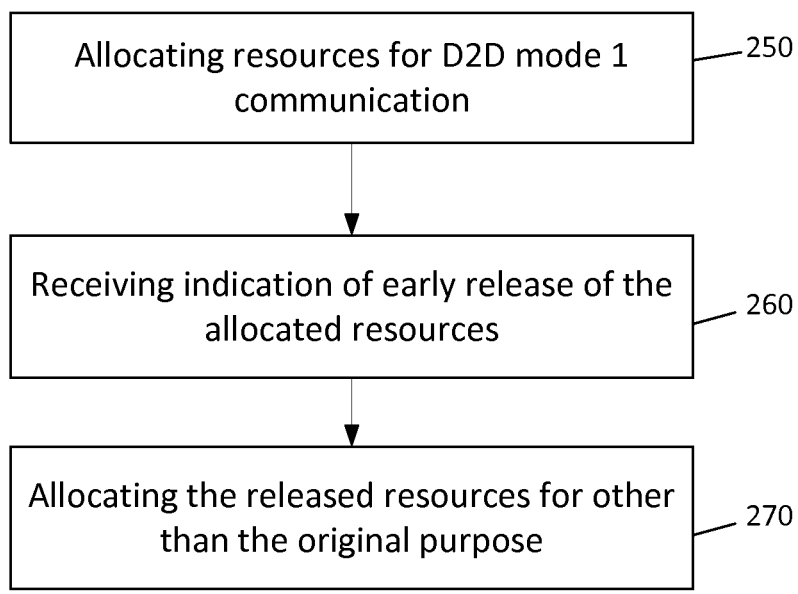
FIG. 2b illustrates an example flow diagram of a method, according to another embodiment.

FIG. 2b illustrates an example flow diagram of a method according to another embodiment. In an embodiment, the method of FIG. 2b may be executed by a network node, such as an eNB. The method may include, at 250, allocating resources for Mode 1 D2D communication, and, at 260, receiving an indication, from a UE, of an early release of resources allocated to the UE for D2D mode 1 communication, and at 270, allocating the released resources for other than the original purpose, such as for PUSCH transmissions.

In an embodiment, the early release of resources applies to delay tolerant data. In an embodiment, the receiving of the indication of the early release may comprise receiving the indication through PUCCH resources. In this embodiment, the indication may use format 1 resource with multiple occurrences during an allocation period. For example, the format 1 signal may be received when the UE decides it will not have any data to transmit during a remainder of the allocation period.

In another embodiment, the receiving of the indication of the early release of resources may include receiving the indication through ProSe BSRs. In an alternative, the possibility of early release triggers ProSe-BSR which UE may send when PUSCH resources become available. Triggering of ProSe-BSR for early release may allow UE to request PUSCH resources for sending the ProSe-BSR. In another alternative, the UE may be configured with a periodic ProSe-BSR expiry time such that a ProSe-BSR is triggered with constant intervals during the allocation period. For example, in one embodiment, the periodic ProSe-BSR may be received when PUSCH resources are available.

According to another embodiment, the receiving includes receiving the indication of the early release of resources in a padding BSR that indicates that a transmission is the last transmission of the UE in the allocation period.

In an embodiment, the method may further include, at 260, polling the ProSe BS by allocating PUSCH resources and receiving the most recently generated periodic ProSe-BSR. According to one example, one BS value (e.g., a combination of six bits) may be reserved for indicating a resource release.

One embodiment is directed to an apparatus comprising at least one processor and at least one memory including computer program code. The at least one memory and computer program code are configured, with the at least one processor, to cause the apparatus at least to indicate, to a network node, an early release of resources allocated to the apparatus for D2D mode 1 communication, where the early release of resources applies to delay tolerant data.

Another embodiment is directed to a method comprising indicating to a network node, by a UE, an early release of resources allocated to the UE for D2D mode 1 communication, where the early release of resources applies to delay tolerant data.

Another embodiment is directed to an apparatus comprising indicating means for indicating to a network node an early release of resources allocated to the apparatus for D2D mode 1 communication, where the early release of resources applies to delay tolerant data.

Another embodiment is directed to a computer program, embodied on a non-transitory computer readable medium, the computer program configured to control a processor to perform a process. The process may include indicating to a network node, by a UE, an early release of resources allocated to the UE for D2D mode 1 communication, where the early release of resources applies to delay tolerant data.

Another embodiment is directed to comprising at least one processor and at least one memory including computer program code. The at least one memory and computer program code are configured, with the at least one processor, to cause the apparatus at least to receive an indication, from a UE, of an early release of resources allocated to the UE for D2D mode 1 communication, where the early release of resources applies to delay tolerant data.

Another embodiment is directed to a method including receiving an indication, from a UE, of an early release of resources allocated to the UE for D2D mode 1 communication, where the early release of resources applies to delay tolerant data.

Another embodiment is directed to an apparatus including receiving means for receiving an indication, from a UE, of an early release of resources allocated to the UE for D2D mode 1 communication, where the early release of resources applies to delay tolerant data.

Another embodiment is directed to a computer program, embodied on a non-transitory computer readable medium, the computer program configured to control a processor to perform a process. The process may include receiving an indication, from a UE, of an early release of resources allocated to the UE for D2D mode 1 communication, where the early release of resources applies to delay tolerant data.

In view of the above, embodiments of the invention may provide several advantages. For example, according to embodiments, UL resources would be used more efficiently because they could be released for PUSCH in the middle of the long Mode 1 allocation period.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
transmitting to a network node, by a user equipment, at least one proximity service buffer status report for device-to-device communication mode 1, wherein resources for the user equipment are scheduled based on the at least one proximity service buffer status report; and indicating, to the network node, an early release of the resources allocated to the user equipment based on the at least one proximity service buffer status report, when the resources allocated to the user equipment apply to delay tolerant data or low priority data; and keeping the resources allocated at the user equipment when the resources are used for delay critical or high priority data.

2. The method as recited in claim 1, wherein the early release is indicated using a physical uplink control channel format 1 resource with multiple occurrences during an allocation period.

3. The method as recited in claim 1, wherein the early release is indicated by transmitting at least one proximity service buffer status report using physical uplink shared channel.

4. The method as recited in claim 1, wherein the user equipment is configured with a periodic proximity service buffer status report expiry timer such that the proximity service buffer status report is triggered with constant intervals during an allocation period.

5. The method as recited in claim 1, wherein the indication of the early release of resources is transmitted using a padding buffer status report to indicate last transmission during an allocation period.

6. The method as recited in claim 1, wherein the proximity service buffer status report is triggered by a polling from the network node with an allocation of physical uplink shared channel resources.

7. An apparatus, comprising:
at least one processor; and
at least one memory including computer program instructions,
wherein the at least one memory and the computer program instructions are configured to, with the at least one processor, cause the apparatus at least to:
transmit to a network node, by the apparatus, at least one proximity service buffer status report for device-to-device communication mode, wherein resources for the apparatus are scheduled based on the at least one proximity service buffer status report; and
indicate, to the network node, an early release of the resources allocated to the apparatus based on the at least one proximity service buffer status report, when the resources allocated to the apparatus apply to delay tolerant data or low priority data; and
keep the resources allocated at the apparatus when the resources are used for delay critical or high priority data.

8. The apparatus as recited in claim 7, wherein the early release is indicated using a physical uplink control channel format 1 resource with multiple occurrences during an allocation period.

9. The apparatus as recited in claim 7, wherein the early release is indicated by transmitting at least one proximity service buffer status report using physical uplink shared channel.

10. The apparatus as recited in claim 7, wherein the apparatus is configured with a periodic proximity service buffer status report expiry timer such that the proximity service buffer status report is triggered with constant intervals during an allocation period.

11. The apparatus as recited in claim 7, wherein the indication of the early release of resources is transmitted using a padding buffer status report to indicate last transmission during an allocation period.

12. The apparatus as recited in claim 7, wherein the proximity service buffer status report is triggered by a polling from the network node with an allocation of physical uplink shared channel resources.

13. An apparatus, comprising:
at least one processor; and
at least one memory including computer program instructions,
wherein the at least one memory and the computer program instructions are configured to, with the at least one processor, cause the apparatus at least to:
receive, from a user equipment, at least one proximity service buffer status report for device-to-device communication mode 1, wherein resources for the user equipment are scheduled based on the at least one proximity service buffer status report;
receive an indication, from the user equipment, of an early release of the resources allocated to the user equipment based on the at least one proximity service buffer status report, wherein the early release of resources applies to delay tolerant data or low priority data, and wherein the user equipment keeps the resources allocated when they are used for delay critical or high priority data; and
allocate the released resources to another user equipment than the user equipment for physical uplink shared channel transmissions.

14. The apparatus as recited in claim 13, wherein the early release is indicated using a physical uplink control channel format 1 resource with multiple occurrences during an allocation period.

15. The apparatus as recited in claim 13, wherein the early release is indicated by receiving at least one proximity service buffer status report on physical uplink shared channel.

16. The apparatus as recited in claim 13, wherein the user equipment is configured with a periodic proximity service buffer status report expiry timer such that the proximity service buffer status report is received with constant intervals during an allocation period.

17. The apparatus as recited in claim 13, wherein the indication of the early release of resources is received by a padding buffer status report to indicate last transmission during an allocation period.

18. The apparatus as recited in claim 13, wherein the proximity service buffer status report is received by a polling from the apparatus with an allocation of physical uplink shared channel resources.

* * * * *